UNITED STATES PATENT OFFICE.

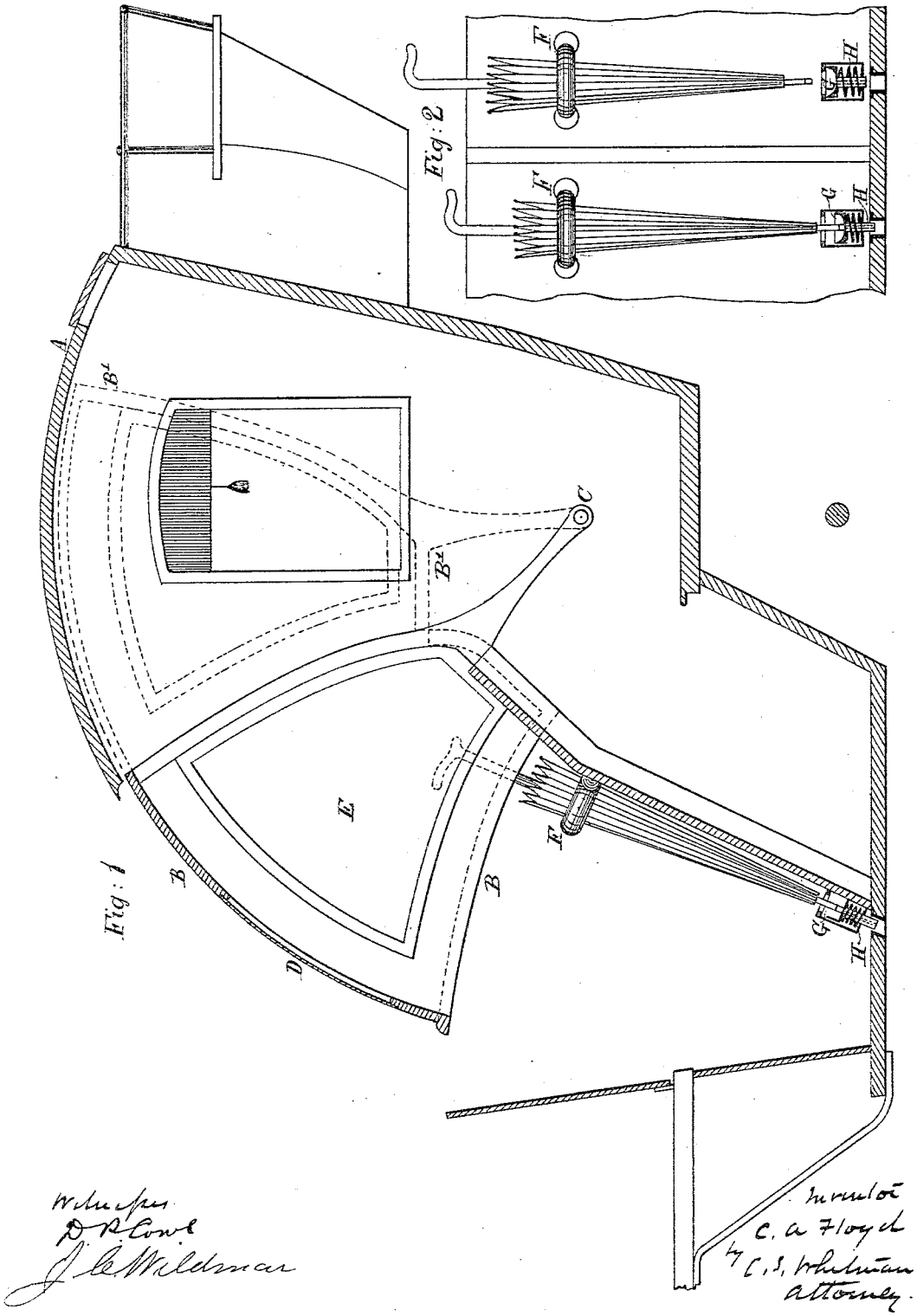

CHARLES ASHBURNHAM FLOYD, OF EASTBOURNE, COUNTY OF SUSSEX, ENGLAND.

HANSOM-CAB.

SPECIFICATION forming part of Letters Patent No. 319,216, dated June 2, 1885.

Application filed June 5, 1884. (No model.) Patented in England December 17, 1883, No. 5,766, and in France February 19, 1884, No. 160,431.

*To all whom it may concern:*

Be it known that I, CHARLES ASHBURNHAM FLOYD, a citizen of England, residing at Eastbourne, in the county of Sussex, England, have invented a new and useful Improvement in Hansom-Cabs and Similar Vehicles, (for which I have obtained a patent in Great Britain No. 5,766, dated 17th December, 1883,) of which the following is a specification.

My invention relates to a construction and arrangement of the roof and hood of a hansom cab or vehicle of like formation so as to provide simple and convenient means of sheltering the passenger from the weather or from sunshine or dust without interfering with the comfort and ventilation of the interior of the vehicle. A similar construction and arrangement are applicable to vehicles of formation somewhat similar to that of a hansom-cab, though made on a smaller scale—such, for instance, as wheeled chairs for invalids, perambulators for children, and the like. I also, in case of a hansom-cab constructed according to my invention, provide appliances for accommodating the umbrellas of passengers so as not to interfere with the comfort of the passengers, and also to insure that they shall not forget to take them with them when they leave the vehicle. I will describe my invention, referring to the accompanying drawings.

Figure 1 is a longitudinal section of the body of a hansom-cab, and Fig. 2 is a front view of the doors thereof.

The roof of the cab, A, is made in the form of a circular arc struck from center line, C. In this line of center, on a pin at each side of the cab within it, I mount a hood, B, which can be advanced as shown in Fig. 1, or drawn back within the roof, as indicated by dotted lines B', the hood being made, like the roof A, circular in form, and concentric with the roof, so that it slides freely within it. The hood may be retracted and held in any intermediate position by a strap or cord worked by either the driver or by the passenger. It may have glass panels, as shown at D, in its top, and at E, in its sides, and these may, if desired, be provided with blinds or curtains. It will be seen that when the hood is advanced to its full extent, as shown in Fig. 1, it effectually shelters the passenger without interfering with the space within the vehicle and without preventing free ventilation.

For the purpose of accommodating umbrellas, which, if they happen to be wet, would be very objectionable within the vehicle, I make each of the handles F of the doors in the form of a ring large enough to admit of an umbrella being thrust down, so that its point rests in a cup, G, mounted on the door with a spring that can yield a little downward when it is subjected to the weight of the umbrella. Under the cup projects a pin, H, which, when the cup is depressed, enters a hole in the floor of the cab and serves as a bolt, fastening the door, so that the passenger cannot open the door for the purpose of leaving the vehicle until he has withdrawn the umbrella and so has relieved the cup G of the weight. The spring of the cup when relieved from the weight withdraws the bolt H, and then the door can be opened.

I do not herein claim the construction of the door-handle as a ring with a cup below it to hold an umbrella, as such construction forms the subject-matter of another application filed by me on the 25th day of July, 1884.

I am aware that hoods which can be advanced or retracted have been heretofore used; but these hoods offered little protection to the passenger from the fact that no provision was made for the driver's seat in the rear.

Having thus described the nature of my invention and the best means I know of carrying the same into practical effect, I claim—

1. The combination, with the stationary roof of a hansom-cab, of a hood consisting of a segmental top with two sides extending down to pivots on which the hood can be turned as on an axis, so that it can be thrown forward or retracted within the stationary roof.

2. A vehicle having a seat for the driver in the rear and a hood in front provided with glass panels, as and for the purpose described.

In testimony whereof I have signed my name to this specification, in the presence of two subscribing witnesses, this 19th day of May, A. D. 1884.

C. ASHBM. FLOYD.

Witnesses:
OLIVER IMRAY,
JNO. P. M. MILLARD.